(12) United States Patent
Higashino et al.

(10) Patent No.: US 7,393,609 B2
(45) Date of Patent: Jul. 1, 2008

(54) BATTERY

(75) Inventors: Tatsuya Higashino, Sagamihara (JP);
Takeshi Miyamoto, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 237 days.

(21) Appl. No.: 10/944,706

(22) Filed: Sep. 21, 2004

(65) Prior Publication Data

US 2005/0079407 A1 Apr. 14, 2005

(30) Foreign Application Priority Data

Oct. 10, 2003 (JP) ............................. 2003-351753

(51) Int. Cl.
*H01M 6/42* (2006.01)
*H01M 2/10* (2006.01)

(52) U.S. Cl. ........................ 429/159; 429/99; 429/100

(58) Field of Classification Search ................. 429/163, 429/97, 99, 96, 100, 175, 172, 159
See application file for complete search history.

(56) References Cited

U.S. PATENT DOCUMENTS

| 5,547,777 | A | 8/1996 | Richards |
| 5,558,949 | A | 9/1996 | Iwatsuki |
| 7,087,344 | B2 * | 8/2006 | Kaneta ........................ 429/66 |
| 2002/0155346 | A1 | 10/2002 | Misra et al. |
| 2003/0124416 | A1 | 7/2003 | Kaneta |

FOREIGN PATENT DOCUMENTS

| JP | 2000-195480 A | 7/2000 |
| JP | 2003-203615 A | 7/2003 |

\* cited by examiner

*Primary Examiner*—Patrick Joseph Ryan
*Assistant Examiner*—Ben Lewis
(74) *Attorney, Agent, or Firm*—Foley & Lardner LLP

(57) ABSTRACT

A battery which includes: a plurality of cell stacks arrayed in a plane, each of which includes a plurality of flat cells stacked on one another; and a planar holding member to be pressed against the plurality of cell stacks for holding the plurality of cell stacks together. Heights of the respective cell stacks are adjusted for deflection of the holding member.

14 Claims, 7 Drawing Sheets

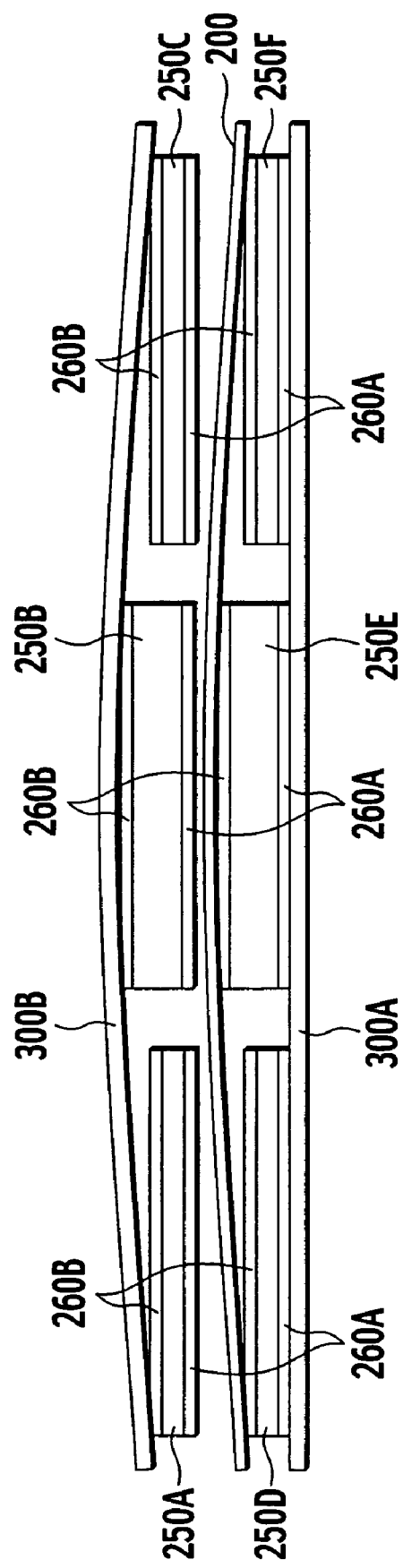

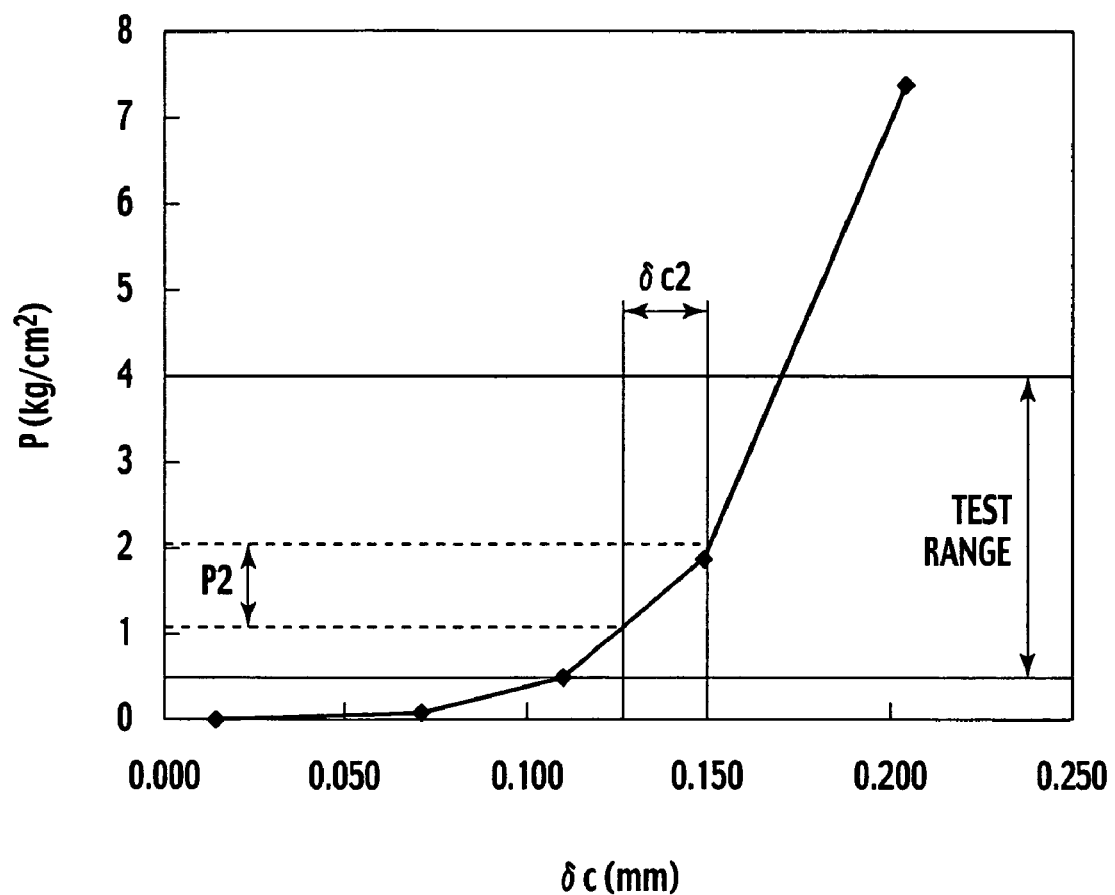

BATTERY

BACKGROUND OF THE INVENTION

1. Field of the Invention

The present invention relates to a high-energy density battery.

2. Description of Related Art

In recent years, growing environmental consciousness has led to a movement to shift the power sources of vehicles from engines using fossil fuels to motors using electrical energy.

The technologies of batteries and cells, which are the power sources of the motors, have also been developed and advanced rapidly.

A battery to be mounted on a vehicle is required to be compact and lightweight as well as capable of charging and discharging high power frequently. The battery is also required to have excellent vibration resistance and heat dissipation characteristics.

A battery disclosed in the Japanese Patent Application Laid-open Publication No. 2000-195480 is one in which a plurality of flat cells are arranged in an outer frame member. Given spaces are provided between each cell by interposing spacers therebetween, so that each cell has good heat dissipation characteristics, thus improving the cycle characteristics and the rate characteristics (discharge characteristics) of the battery.

SUMMARY OF THE INVENTION

The above-described battery, however, is a battery developed for use in a capacitor system. The production efficiency thereof is poor, and the volume efficiency thereof is low because of numerous parts thereof. Moreover, pressure is not uniformly applied on each of the cells. Accordingly, after frequently repeated charging and discharging, some of the cells have reduced capacity and shortened life caused by gas generation inside the cells.

To enable the above-described battery to be used as a battery mounted on a vehicle, the battery needs to further have vibration resistance for ensuring the stable operation under continuous vibration, and needs to efficiently dissipate heat thereof even in the case that the cells are arrayed in an extremely high-density.

An object of the present invention is to provide a compact and lightweight high-energy density battery which is optimally constituted as a high-power source.

An aspect of the present invention is a battery comprising: a plurality of cell stacks arrayed in a plane, each of the cell stacks comprising a plurality of flat cells stacked on one another; and a planar holding member pressed against the plurality of cell stacks for holding the plurality of cell stacks together, wherein heights of the respective cell stacks are adjusted for deflection of the holding member.

BRIEF DESCRIPTION OF THE DRAWINGS

The invention will now be described with reference to the accompanying drawings wherein:

FIG. 8 is a sectional view of a battery in a state where the shims are filled in.

FIG. 9 is a graph showing a relationship between the compressive deflection margin per cell $\delta c$ and the pressure P on the cell (second embodiment).

DETAILED DESCRIPTION OF THE PREFERRED EMBODIMENT

Figure 1:
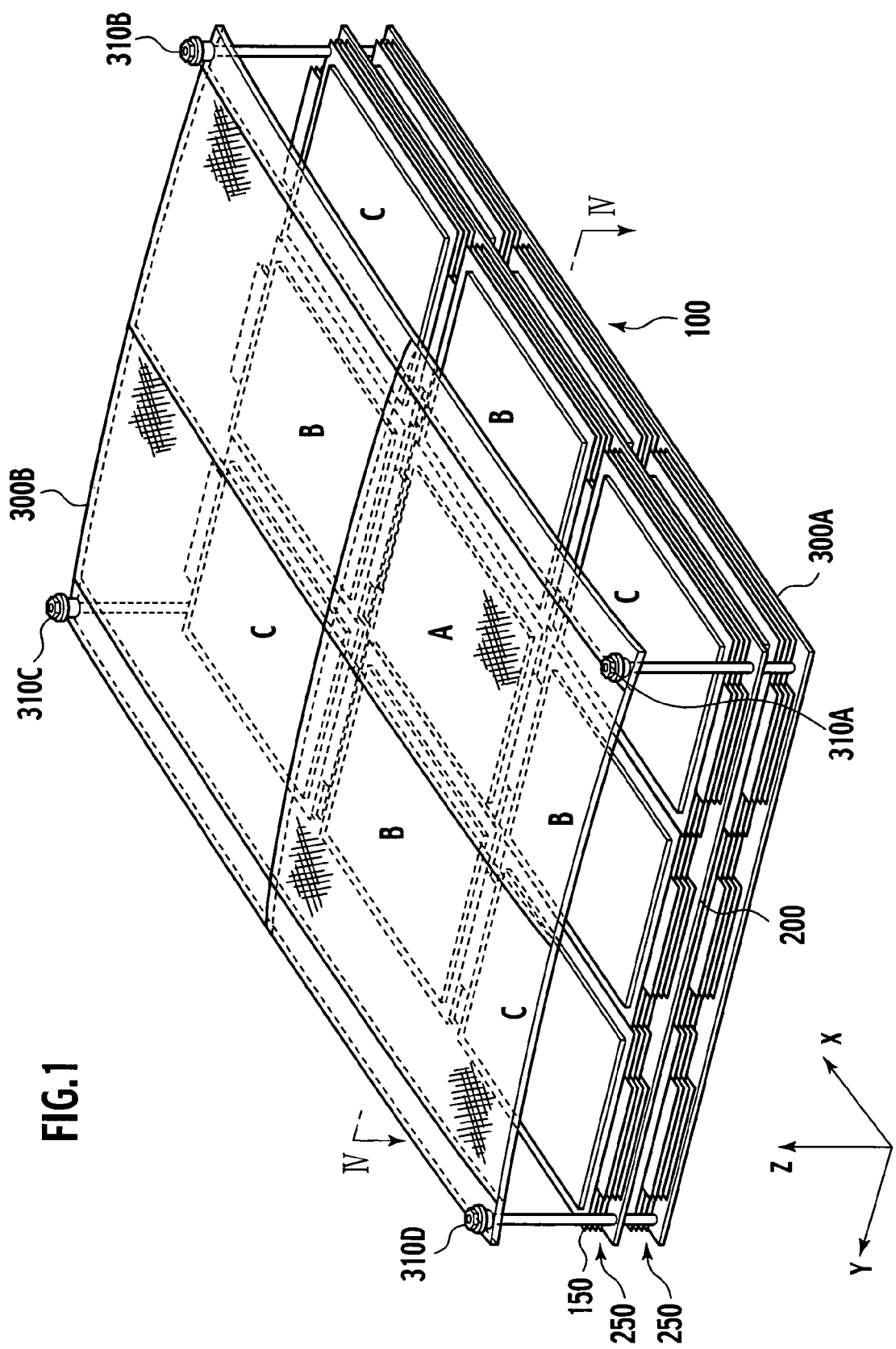
FIG. 1 is a perspective view of a battery of the present invention, schematically showing a state of stacked cells.

Embodiments of the present invention will be explained below with reference to the drawings, wherein like members are designated by like reference characters.

First Embodiment

A battery according to a first embodiment of the present invention includes multiple layers of nine flat cells (hereinafter, simply referred to as cells) arrayed in three rows in a longitudinal direction and in three rows in a lateral direction, respectively. The layer of the cells are stacked on one another and arrayed in a thickness direction of the cell (a direction substantially perpendicular to flat faces of the cells). The stacked cells are held together, with both faces thereof pressed on in the thickness direction thereof by heat sinks. The longitudinal and lateral positions of the cells in the battery of this embodiment are determined according to the thickness of each cell, so that the same pressures are applied on all the cells even with the deflected heat sinks.

Specifically, as shown in FIG. 1, in a battery 100, two arrays of cell stacks 250 are sandwiched between a lower heat sink 300A and an upper heat sink 300B. A middle heat sink 200 is sandwiched between the two arrays of cell stacks 250. In the lower arrays of cell stacks 250 between the lower and middle heat sinks 300A and 200, cells 150 are stacked in four layers in a thickness direction thereof (Z-direction in FIG. 1). In each layer, the cells 150 are arrayed in three rows in a longitudinal direction (X-direction in FIG. 1) and three rows in a lateral direction (Y-direction in FIG. 1), respectively (nine cells in total).

The heat sinks 300A and 300B are joined together at the four corners by means of four fixing bolts 310A to 310D having pressure adjustment function. By tightening the fixing bolts 310A to 310D, pressure is added on the cell stacks 250 through the heat sinks 300A and 300B, whereby the cell stacks 250 are held together.

Note that, in the cell stacks 250, the cells 150 in the first layer are connected in parallel to those in the second layer, and the cells 150 in the third layer are connected in parallel to those in the fourth layer. Moreover, among the cells 150, those arranged in the same row in the longitudinal direction are connected in series to each other.

In the battery 100, position of each cell 150 in a layer is determined according to the thickness of each cell 150, taking deflections of the heat sinks 300A and 300B, when the four fixing bolts 310A to 310D are tightened (see FIG. 1), into consideration. The deflection implies displacement of the inner face of the heat sink in a thickness direction thereof (see FIG. 3), relative to a reference point at one of the four corners of the heat sink, to which the fixing bolt is connected.

Figure 2:
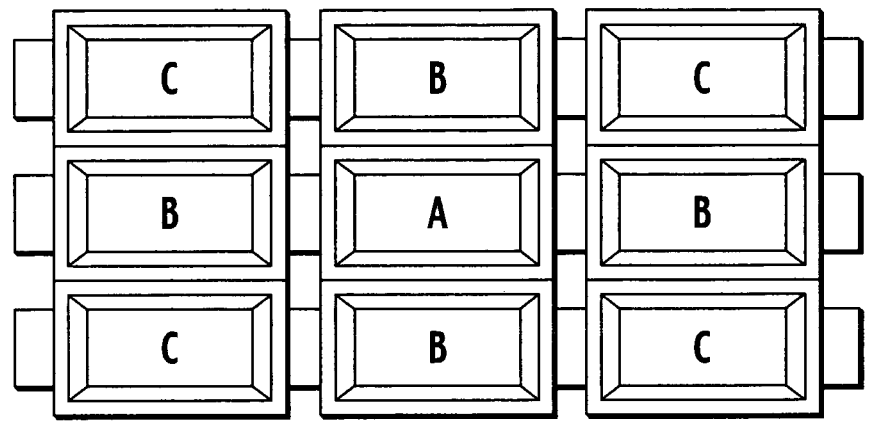
FIG. 2 is a view for explaining an arrangement of the cells which are classified according to their thicknesses.

Each cell 150 is manufactured to have a thickness of, for example, 3.3 mm with a tolerance of ±0.1 mm. As a result, there are those with a thickness of 3.4 mm and those with a thickness of 3.2 mm among non-defective cells 150. In the present invention, before the battery 100 is manufactured, the cells 150 are classified into ranks A, B and C; cells with thickness close to the upper limit of the tolerance (with a thickness of nearly 3.4 mm) are classified as the Rank A; cells with thickness close to the middle of the tolerance (with a thickness of 3.3 mm) are classified as the Rank B; cells with thickness close to the lower limit of the tolerance (with a thickness of nearly 3.2 mm) are classified as the Rank C. As shown in FIGS. 1 and 2, the cells 150 classified as the Rank A are stacked in an A region (central portion) where the deflections of the heat sinks 300A and 300B are the greatest. The cells 150 classified as the Rank B are stacked in B regions where the deflections are the second greatest to the A region in the heat sinks 300A and 300B. The cells 150 classified as the Rank C are stacked in C regions where the deflections are the smallest.

Note, however, that variation in the heights of the cell stacks in the four B regions shown in FIG. 2 is kept within a range of about 30 μm or less, as well as the variation in the four C regions.

Figure 3:
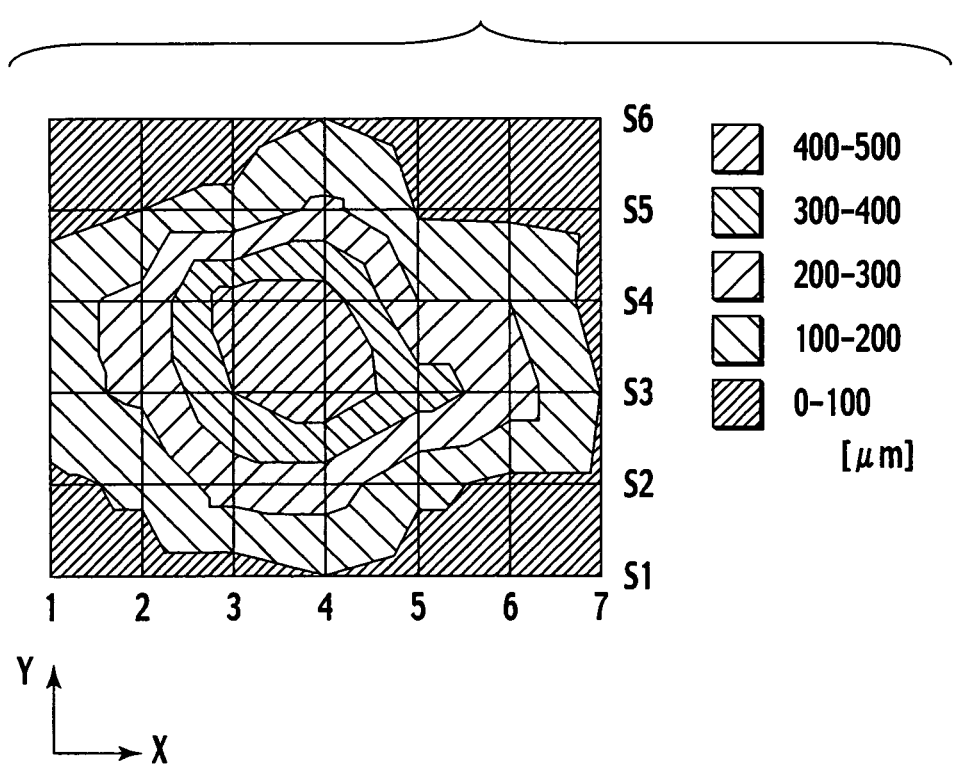
FIG. 3 is a view showing a distribution of deflection of a heat sink, or a distribution of the heights of cell stacks.

As described above, the cells are classified beforehand according to their thicknesses, and the cells classified into the ranks are stacked in the respective predetermined regions. Thus, the distribution of the heights of the cell stacks can be made such that, as shown in FIG. 3, the height is the largest in the central portions of the heat sinks 300A and 300B, and becomes smaller as it is closer to the four corners.

Figure 4:
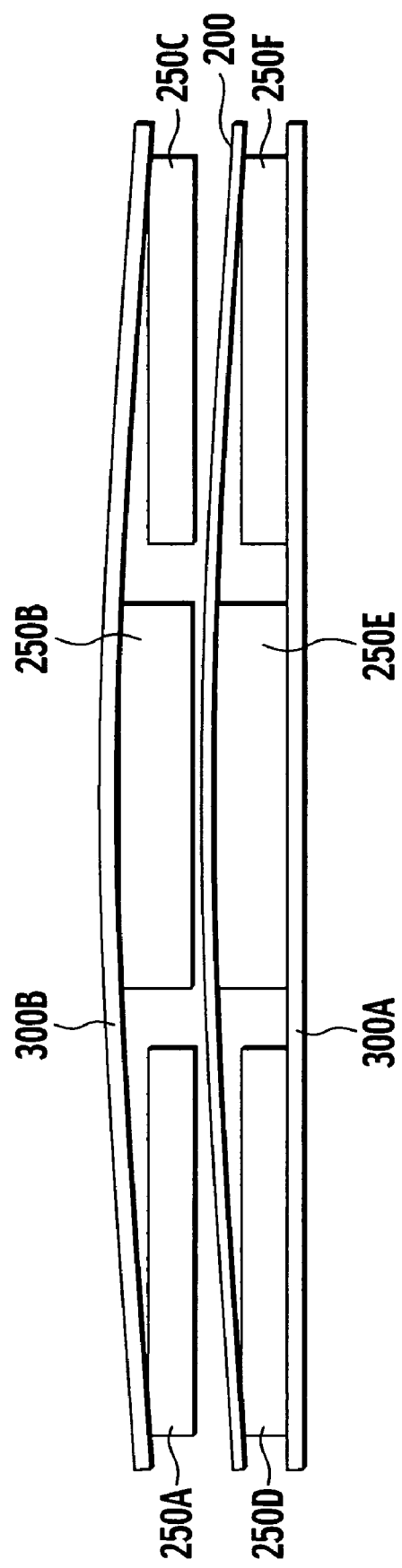
FIG. 4 is a sectional view taken along the line IV-IV in FIG. 1.

As shown in FIG. 4, if the heights of cell stacks 250A to 250F in the respective regions are suitably adjusted, uniform pressures can be applied to all the cells 150 constituting the battery 100. Specifically, the heights of the cell stacks 250A to 250F are adjusted so that the positions of the upper faces of the cell stacks 250A to 250C and the positions of the lower faces of the cell stacks 250D to 250F range along the curved inner faces of the heat sinks 300B and 300A, respectively, the heat sinks 300A and 300B each in a deflected state due to the tightening of the fixing bolts 310A to 310D. FIG. 4 exaggeratingly shows a state of the upper and middle heat sinks 300B and 200 being deflected by the fastening of the fixing bolts 310A to 310D. In practice, however, if the rigidities of the lower and upper heat sinks 300A and 300B are the same, the lower heat sink 300A is deflected in the opposite direction to the direction in which the upper heat sink 300B is deflected by substantially the same amount as that of the upper heat sink 300B, the lower and upper heat sinks 300A and 300B being symmetric with respect to a plane of the middle heat sink 200. Moreover, there are gaps between the heat sinks and the cell stacks in FIG. 4 for exaggerated representation. In practice, however, the gaps are not created because the deflection of the heat sink is a very slight deflection equivalent to not more than the amount of deformation of the cell 150 in the thickness direction thereof.

In general, in the case of a flat cell, since an outer casing member enclosing electrodes inside thereof is not rigid, gas generated in the cell accumulates between the electrodes after charging and discharging are frequently repeated. Accordingly, cycle deterioration (deterioration in cell performance after cycle of charging and discharging) occurs, and the life of the cell is shortened. That is, if the pressures to be applied on the respective cell stacks are made equal and uniform, it is possible to put suitable pressures on all the cells, thus preventing the accumulation of the gas between the electrodes.

When the heights of all the cell stacks are made even without considering the deflections of the heat sinks 300A and 300B, the result is that larger pressures are applied to the cell stacks at the closest positions to the fixing bolts 310A to 310D, and that the smallest pressure is applied to the cell stacks in the central portion of the heat sinks 300A and 300B. In order that the same pressures are applied to all the cell stacks only by tightening the fixing bolts 310A to 310D in the four corners of the heat sinks 300A and 300B, the rigidities of the heat sinks 300A and 300B need to be increased to a considerable extent. However, if the rigidities are increased, the thicknesses of the heat sinks 300A and 300B are necessarily increased, and therefore the weights thereof become larger.

On the other hand, in order that the same pressures are applied to all the cell stacks without increasing the rigidities of the heat sinks 300A and 300B, the number of fixing bolts needs to be increased to fix more points on the heat sinks. If the number of points to be fixed is increased, spaces must be secured for attachment of the fixing bolts, and therefore the areas of the heat sinks 300A and 300B become larger.

As in this embodiment, if the heights of the cell stacks are adjusted for deflections of the heat sinks 300A and 300B, it is possible to apply uniform pressures on all the cells constituting the battery 100 without increasing the rigidities of the heat sinks 300A and 300B, and without increasing the number of the points where the fixing bolts are attached. Thus, the battery 100 can be made compact and lightweight.

Figure 5:
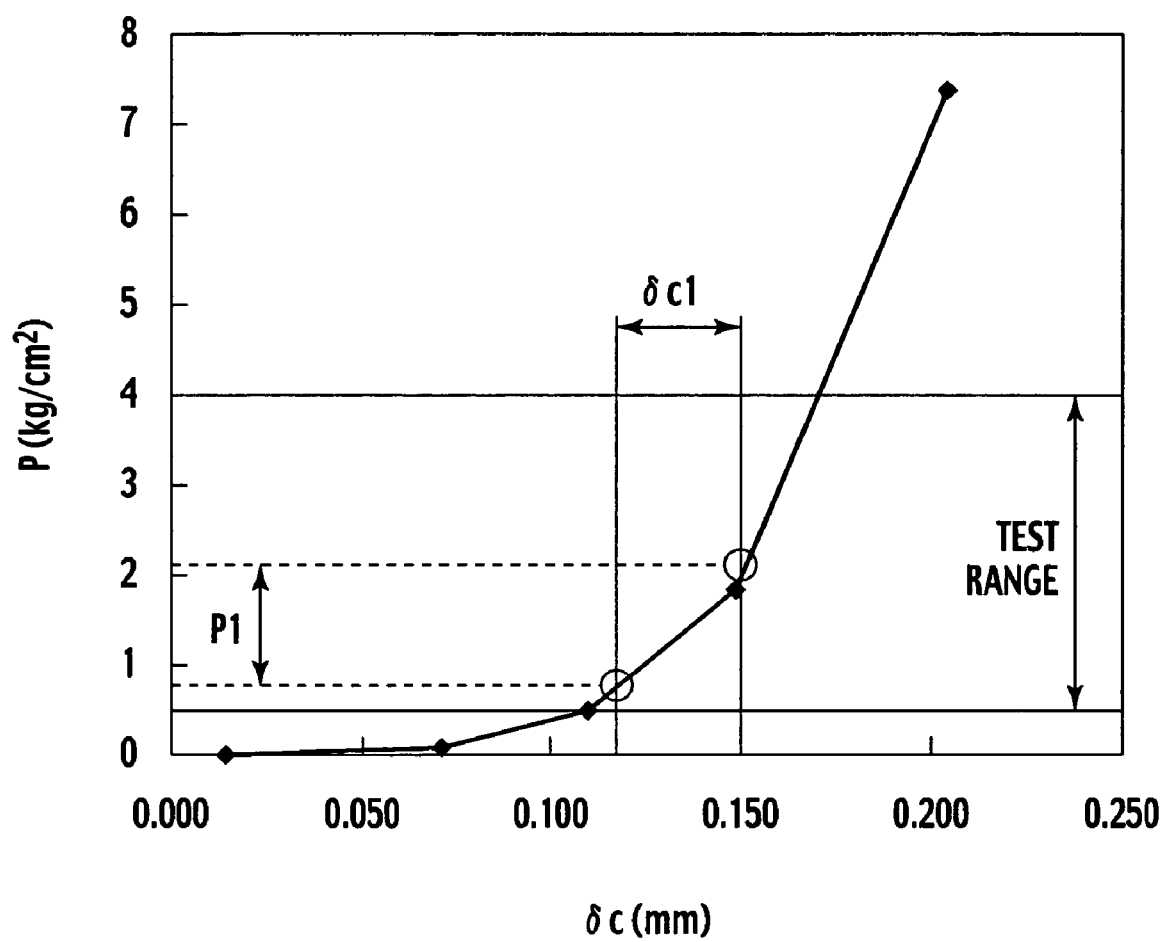
FIG. 5 is a graph showing a relationship between the compressive deflection margin per cell $\delta c$ and the pressure P on the cell (first embodiment).

FIG. 5 shows a relationship between the compressive deflection margin δc per cell and the pressure P on the cell. As described above, the cells are classified into three ranks according to their thicknesses, and the three ranks of cells are arranged so that the distribution of the heights of the cell stacks becomes as shown in FIG. 3. By doing this, the compressive deflection margin δc per cell is kept within a range δc1 of approximately 0.12 mm to 0.15 mm. Moreover, the pressure P to be applied on each cell can be adjusted within a range P1 of 0.75 Kgf/cm2 to 2.1 Kgf/cm2 (74 KPa to 206 KPa). As shown in FIG. 5, when the compressive deflection margin δc is within the range δc1, the contact pressure P changes substantially linearly within the range P1. Therefore, in order to obtain a target pressure, selection of the cells can be made such that the compressive deflection of each cell becomes a compressive deflection margin per cell corresponding to the target pressure.

According to this embodiment, by adjusting the heights of the cell stacks for deflections of the heat sinks, the pressures to be applied on the cells can be adjusted to an optimal pressure for the cells, and the rigidities of the heat sinks can be reduced. Further, the number of the fixing bolts can be reduced to a minimum number, whereby the battery can be compact and lightweight. The heights of the cell stacks can be adjusted by selecting cells having appropriate thicknesses.

Second Embodiment

A battery according to a second embodiment of the present invention is almost the same as the battery of the first embodiment. The difference is that shims are used to adjust the heights of cell stacks in the second embodiment.

Figure 6A:
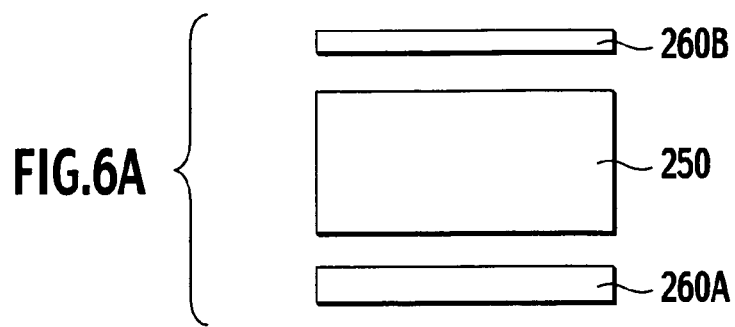
FIG. 6A shows arrangement of a coarse adjustment shim and a fine adjustment shim.
Figure 6B:
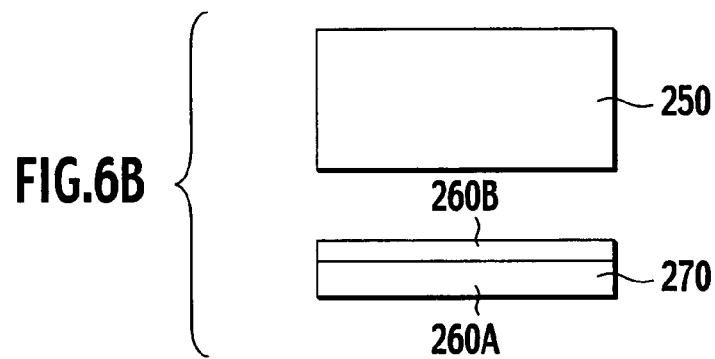
FIG. 6B is a view showing an assembly of the coarse and fine adjustment shims.

Classifying of the cells according to their thicknesses is required in the first embodiment. In this embodiment, shim is used for the height adjustment, whereby the workability thereof is improved. The shim in this embodiment includes a coarse adjustment shim 260A and a fine adjustment shim 260B as shown in FIG. 6A. The coarse adjustment shim 260A is made of a metal material such as phosphor bronze. Since the metal material is hard with less elasticity, the coarse adjustment shim 260A is used to coarsely adjust the height of a cell stack. The fine adjustment shim 260B is made of an elastic material such as resin or rubber material. Since the material can be easily deformed, the fine adjustment shim 260B is used to finely adjust the pressure to be applied on the cells. As shown in FIG. 6A, the coarse adjustment shim 260A is set on the lower side of a cell stack 250 (on the heat sink 300A-side), and the fine adjustment shim 260B is set on the upper side of the cell stack 250 (on the heat sink 300B-side). In addition, a shim 270 shown in FIG. 6B is an assembly of the coarse adjustment shim 260A and the fine adjustment shim 260B stacked thereon. This shim 270 is filled in a space on the lower side of a cell stack 250 (on the heat sink 300A-side).

Figure 7:
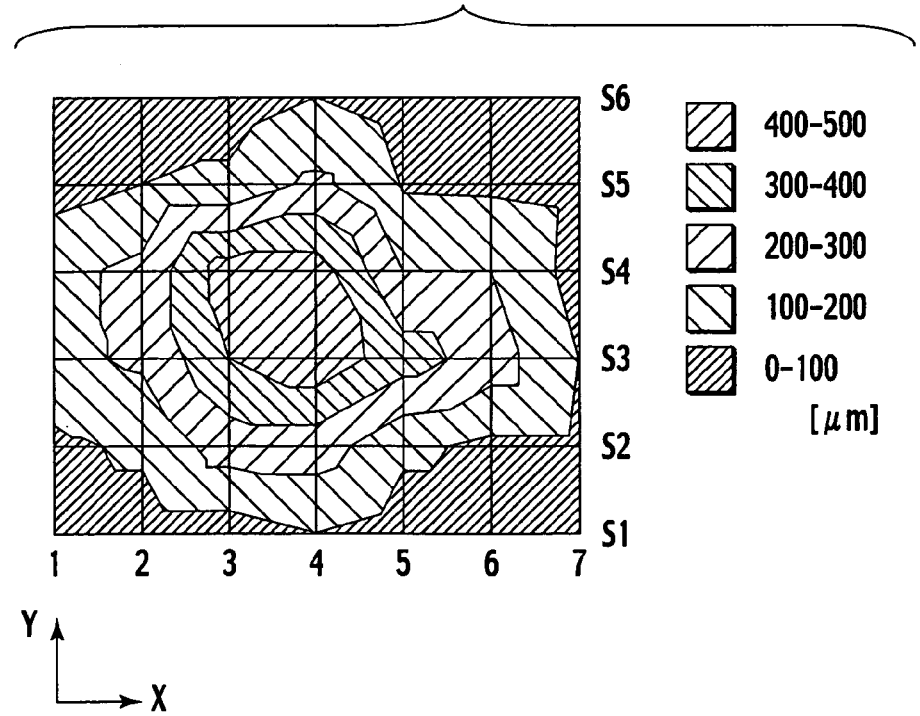
FIG. 7 is a view showing a distribution of deflection of the heat sink, or a distribution of the heights of cell stacks.

In this embodiment, cells 150 are first stacked on one another regardless of the thickness of the respective cells, and thereafter, the heights of nine cell stacks 250 are measured. Then, the shims are selected for each cell stack so that the distribution of the heights of the cell stacks becomes as shown in FIG. 7, where the height is the largest in the central portions of heat sinks 300A and 300B, and becomes smaller as it is closer to the four corners. In the height adjustment, when the separate-type shims shown in FIG. 6A are used, the coarse adjustment shims 260A are set on the lower sides of the cell stacks 250A to 250F, and the fine adjustment shims 260B are set on the upper sides of the cell stacks 250A to 250F, as shown in FIG. 8 in which a sectional view of the battery 10 is illustrated. The reason why the coarse adjustment shims 260A are set on the lower sides of the cell stacks 250A to 250F is that the shim 260A has a large-scale height adjustment function (is capable of roughly adjusting the height) because the shim 260A is a non-elastic body. Moreover, the reason why the fine adjustment shims 260B are set on the upper sides of the cell stacks 250A to 250F is that the shim 260B has a small-scale height adjustment function because the shim 260B is an elastic body. On the other hand, when the shims shown in FIG. 6B are used, the shims 270 are set on the lower sides of the cell stacks 250A to 250F, which is not illustrated in FIG. 8 though.

As shown in FIG. 8, if the heights of cell stacks 250A to 250F in the respective regions are suitably adjusted by selecting shims having appropriate thicknesses, uniform pressures can be applied to all the cells 150 constituting the battery 100. Specifically, the heights of the cell stacks 250A to 250F are adjusted so that the positions of the upper faces of the cell stacks 250A to 250C and the positions of the lower faces of the cell stacks 250D to 250F range along the curved inner faces of the heat sinks 300B and 300A, respectively, the heat sinks 300A and 300B each in a deflected state due to the tightening of the fixing bolts 310A to 310D. FIG. 8 exaggeratingly shows a state of the upper and middle heat sinks 300B and 200 being deflected by the fastening of the fixing bolts 310A to 310D. In practice, however, if the rigidities of the lower and upper heat sinks 300A and 300B are the same, the lower heat sink 300A is deflected in the opposite direction to the direction in which the upper heat sink 300B is deflected by substantially the same amount as that of the upper heat sink 300B, the lower and upper heat sinks 300A and 300B being symmetric with respect to a plane of the middle heat sink 200. Moreover, there are gaps between the heat sinks and the cell stacks in FIG. 8 for exaggerated representation. In practice, however, the gaps are not created because the deflection of the heat sink is a very slight deflection equivalent to or not more than the amount of elastic deformation of the shim 260B in the thickness direction thereof.

According to this embodiment, as in the first embodiment, it is possible to apply uniform pressures on all the cells constituting the battery 100 without increasing the rigidities of the heat sinks 300A and 300B, and without increasing the number of the points where the fixing bolts are attached. Thus, the battery 100 can be made compact and lightweight.

FIG. 9 shows a relationship between the compressive deflection margin $\delta c$ per cell and the pressure P on the cell. As described above, the heights of the cell stacks are adjusted by using shims, so that the distribution of the heights of the cell stacks becomes as shown in FIG. 7. By doing this, the compressive deflection margin $\delta c$ per cell is kept within a range $\delta bc2$ of approximately 0.127 mm to 0.150 mm. Moreover, the pressure P to be applied on each cell can be adjusted within a range P2 of 1.1 Kgf/cm2 to 2.1 Kgf/cm2 (108 KPa to 206 KPa) As shown in FIG. 9, when the compressive deflection margin $\delta c$ is within the range $\delta c2$, the contact pressure P changes substantially linearly within the range P2. Therefore, in order to obtain a target pressure, selection of the shims can be made such that the compressive deflection of each cell becomes a compressive deflection margin per cell corresponding to the target pressure.

According to this embodiment, by adjusting the heights of the cell stacks for deflections of the heat sinks, the pressures to be applied on the cells can be adjusted to an optimal pressure for the cells, and the rigidities of the heat sinks can be reduced. Further, the number of the fixing bolts can be reduced to a minimum number, whereby the battery can be compact and lightweight. The heights of the cell stacks can be adjusted by selecting shims having appropriate thicknesses.

In other words, the battery of the present invention is a battery 100 formed in such a manner that a plurality of cell stacks 250, each including a plurality of flat cells 150 stacked, are arrayed in a plane, and that the cell stacks 250 are held all together by pressing the arrayed cell stacks 250 with plate-type holding members 300A and 300B from both faces of the cell stacks 250 in a thickness direction of the cells 150. In the battery 100, the heights of the respective cell stacks 250 are adjusted while considering the deflections of the holding members 300A and 300B.

The constitution as described above resultantly enables uniform contact pressures to be applied to all the cells 150 regardless of the positions of the cells 150. Accordingly, even if charging and discharging are frequently repeated, reductions in capacity and life of the cell caused by gas generated inside the cell can be eliminated, and therefore the reliability of the battery 100 is enhanced. Thus, it is possible to mount this battery on a vehicle.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2003-351753, filed on Oct. 10, 2003, the disclosure of which is expressly incorporated herein by reference in its entirety.

What is claimed is:

1. A battery comprising:
   a plurality of cell stacks arrayed in a plane, each of the cell stacks comprising a plurality of flat cells stacked on one another;
   a planar holding member pressed against the plurality of cell stacks for holding the plurality of cell stacks together; and
   a binding member connected to the holding member, which presses the holding member against the plurality of cell stacks, wherein height of the cell stack farther from the binding member is greater than a height of the cell stack closer to the binding member prior to compression.

2. The battery according to claim 1, wherein the heights of the respective cell stacks are adjusted by stacking the cells having different thicknesses.

3. The battery according to claim 1, wherein the heights of the respective cell stacks are adjusted by interposing a shim between the cell stack and the holding member.

4. The battery according to claim 1, wherein the binding member is connected to the holding member at a peripheral edge thereof, and the heights of the cell stacks in a central region of the holding member are greater than the heights of cell stacks in a peripheral region thereof.

5. The battery according to claim 1, wherein the holding member comprises a heat sink for cooling the plurality of the cell stacks.

6. A battery comprising:
a plurality of cell stacks arrayed in a plane, each of the cell stacks comprising a plurality of flat cells stacked on one another;
a planar holding member pressed against the plurality of cell stacks for holding the plurality of cell stacks together; and
a binding member connected to the holding member, which presses the holding member against the plurality of cell stacks;
wherein the plurality of cell stacks are sandwiched between a first shim and a second shim,
wherein a magnitude of elasticity of the second shim is greater than a magnitude of elasticity of the first shim,
wherein a height of the cell stack farther from the binding member is greater than a height of the cell stack closer to the binding member prior to compression.

7. The battery according to claim 6, wherein the first and second shims are assembled together.

8. A method for assembling a battery which includes: a plurality of cell stacks arrayed in a plane, each of the cell stacks including a plurality of flat cells stacked on one another; and a planar holding member pressed against the plurality of cell stacks for holding the plurality of cell stacks together, and a binding member connected to the holding member, which presses the holding member against the plurality of cell stacks, the method comprising:
setting heights of the respective cell stacks such that a height of the cell stack farther from the binding member is greater than a height of the cell stack closer to the binding member prior to compression.

9. The method according to claim 8, wherein the heights of the respective cell stacks are set by stacking the cells having different thicknesses.

10. The method according to claim 8, wherein the heights of the respective cell stacks are set by interposing a shim between the cell stack and the holding member.

11. The method according to claim 8, wherein the binding member is connected to the holding member at a peripheral edge thereof, and the heights of the cell stacks are set to be greater in a central region of the holding member than the height of the cell stacks in a peripheral region thereof.

12. The method according to claim 8, wherein the holding member comprises a heat sink for cooling the plurality of the cell stacks.

13. A method for assembling a battery which includes: a plurality of cell stacks arrayed in a plane, each of the cell stacks including a plurality of flat cells stacked on one another; a planar holding member pressed against the plurality of cell stacks for holding the plurality of cell stacks together, and a binding member connected to the holding member, which presses the holding member against the plurality of cell stacks, the method comprising:
setting heights of the respective cell stacks by interposing a shim between the cell stack and the holding member such that a height of the cell stack farther from the binding member is greater than a height of the cell stack closer to the binding member prior to compression,
wherein the shim comprises: a first shim setting the height of the cell stack according to a first setting; and/or a second shim for setting the height of the cell stack according to a second setting finer than the first setting, wherein a magnitude of elasticity of the second shim is greater than a magnitude of elasticity of the first shim.

14. The method according to claim 13, further comprising: assembling the first and second shims together.

\* \* \* \* \*